(12) United States Patent
Kim

(10) Patent No.: US 7,886,373 B2
(45) Date of Patent: Feb. 15, 2011

(54) METHOD OF CONTROLLING TEMPERATURE OF WARM WATER OF BIDET

(75) Inventor: Bong-Gyun Kim, Cheonan-si (KR)

(73) Assignee: Novita Co., Ltd. (KR)

( * ) Notice: Subject to any disclaimer, the term of this patent is extended or adjusted under 35 U.S.C. 154(b) by 1146 days.

(21) Appl. No.: 11/553,799

(22) Filed: Oct. 27, 2006

(65) Prior Publication Data

US 2007/0256225 A1    Nov. 8, 2007

(30) Foreign Application Priority Data

May 3, 2006    (KR) .................... 10-2006-0040158

(51) Int. Cl.
*A47K 3/022* (2006.01)
(52) U.S. Cl. ........................ 4/420.2; 4/420.4
(58) Field of Classification Search ....... 4/420.1–420.5, 4/443, 447–448
See application file for complete search history.

(56) References Cited

U.S. PATENT DOCUMENTS 6,649,884 B2 * 11/2003 Nonomura .................. 4/420.2

FOREIGN PATENT DOCUMENTS

JP    08027871    1/1996
JP    11350573    12/1999

OTHER PUBLICATIONS

Chinese Office Action for application No. 200610163934.2 issued Feb. 6, 2009 with English Translation.
Ma Xiao "A controlled automatic constant-temperature heater conceived for air sampling"; Environments Monitoring in China 1996, 12 (5); pp. 48-50; cited in the Chinese Office Action issued Feb. 6, 2009.

* cited by examiner

*Primary Examiner*—Tuan N Nguyen
(74) *Attorney, Agent, or Firm*—Cantor Colburn LLP

(57) ABSTRACT

Provided is a method of controlling temperature of warm water of a bidet. The method includes: a first step of detecting a current temperature of warm water stored in a storage tank; a second step of gradually adjusting intensity of power supplied to a heating means depending on a difference when the current temperature of the warm water is lower than a target temperature; and a third step of cutting the power supplied to the heating means when the current temperature of the warm water is equal to the target temperature after the second step. Therefore, the warm water can be precisely maintained at a set temperature by checking a temperature of cleaning water in a storage tank using a sensor in real time, and gradually controlling intensity of power supplied to a heating means on the basis of the checked water temperature.

2 Claims, 3 Drawing Sheets

METHOD OF CONTROLLING TEMPERATURE OF WARM WATER OF BIDET

CROSS-REFERENCE TO RELATED APPLICATION

This application claims the benefit of Korean Patent Application No. 10-2006-0040158, filed May 3, 2006, the disclosure of which is hereby incorporated herein by reference in its entirety.

BACKGROUND OF THE INVENTION

1. Field of the Invention

The present invention relates to a method of controlling temperature of warm water of a bidet, and more particularly, to a method of controlling temperature of warm water of a bidet which enables the warm water to be precisely maintained at a set temperature by checking the temperature of cleaning water in a storage tank using a sensor in real time, and gradually controlling the intensity of power supplied to a heating unit on the basis of the checked water temperature.

2. Description of the Related Art

FIG. 1 illustrates a conventional warm water storage type bidet. The bidet includes a water supply means 1 for supplying cleaning water, a storage tank 2 for storing the cleaning water supplied from the water supply means 1, a heating means 3 for heating the water in the storage tank 2 to maintain the water at a certain temperature, a flow rate adjustment part 4 for adjusting a flow rate of the cleaning water discharged from the storage tank 2, a cleaning nozzle 5 installed at a water outlet port of the flow rate adjustment part 4 for ejecting water to a user's rectal area, a bidet nozzle 6 installed at the water outlet port of the flow rate adjustment part 4 for ejecting water to a user's genitals, a nozzle cleaning part 7 for cleaning the cleaning nozzle 5 and the bidet nozzle 6, a key part 8 having a plurality of keys for performing the cleaning and bidet functions, a temperature sensor 9 for detecting current temperature of the cleaning water stored in the storage tank 2, a seating sensor 10 for detecting whether a user is seated on a closet seat, and a controller 11 for operating the flow rate adjustment part 4 in response to input of the key part 8 to discharge the cleaning water through the cleaning nozzle 5 or the bidet nozzle 6, and controlling the heating means 3 to allow the cleaning water detected by the temperature sensor 9 to be maintained at a target temperature.

In the bidet as described above, as shown on FIG. 2, a conventional method of controlling the temperature of warm water includes applying power to the heating means 3 to 100% when the current temperature of the cleaning water in the storage tank 2 detected by the temperature sensor 9 is lower than the target temperature, and cutting the power supply of the heating means 3 when the current temperature of the cleaning water in the storage tank 2 is higher than the target temperature after supplying the power.

However, in the conventional method, the cleaning water in the storage tank 2 is heated by applying a power of 100% to the heating means 3 to allow the warm water to be maintained at a temperature set to perform the cleaning and bidet functions, thereby causing overheating of the cleaning water.

In addition, while the cleaning water in the storage tank 2 is checked using the temperature sensor 9 in real time, since the power applied to the heating means 3 is fully applied or cut, it is difficult to precisely control the temperature of the warm water discharged in real time.

SUMMARY OF THE INVENTION

In order to solve the foregoing and/or other problems, it is an aspect of the present invention to provide method of controlling temperature of warm water of a bidet which enables the warm water to be precisely maintained at a set temperature by checking the temperature of cleaning water in a storage tank using a sensor in real time, and gradually controlling the intensity of power supplied to a heating unit on the basis of the checked water temperature.

Additional aspect and advantages of the present invention will be set forth in part in the description which follows and, in part, will be obvious from the description, or may be learned by practice of the invention.

The foregoing and/or other aspects of the present invention may be achieved by providing a method of controlling temperature of warm water of a bidet including: a first step of detecting a current temperature of warm water stored in a storage tank; a second step of gradually adjusting intensity of power supplied to a heating means depending on a difference when the current temperature of the warm water is lower than a target temperature; and a third step of cutting the power supplied to the heating means when the current temperature of the warm water is equal to the target temperature after the second step.

In addition, the second step may include applying a power of 60% to the heating means when the current temperature T is (F-1° C.), applying a power of 80% to the heating means when the current temperature T is (F-2° C.), and applying a power of 100% to the heating means when the current temperature T is (F-3° C.), thereby controlling the heating means depending on the difference between the current temperature T and the target temperature F in a stepped manner.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE INVENTION

Figure 1:
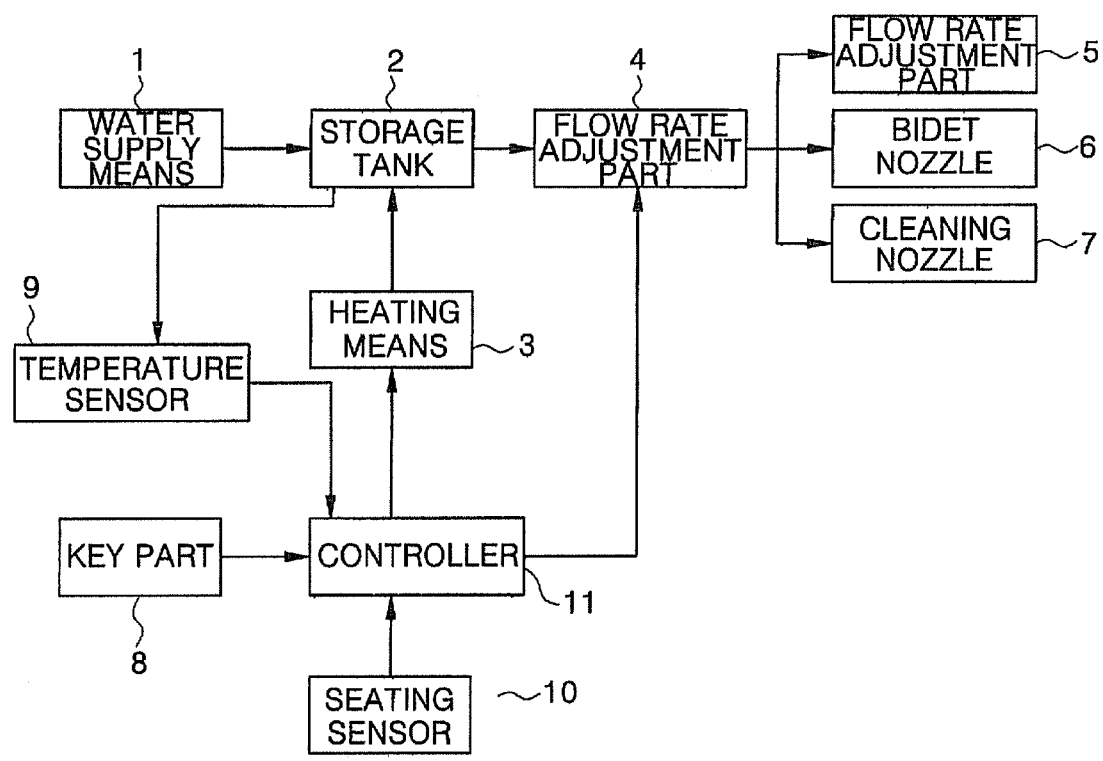
FIG. 1 is a block diagram of a conventional bidet.
Figure 2:
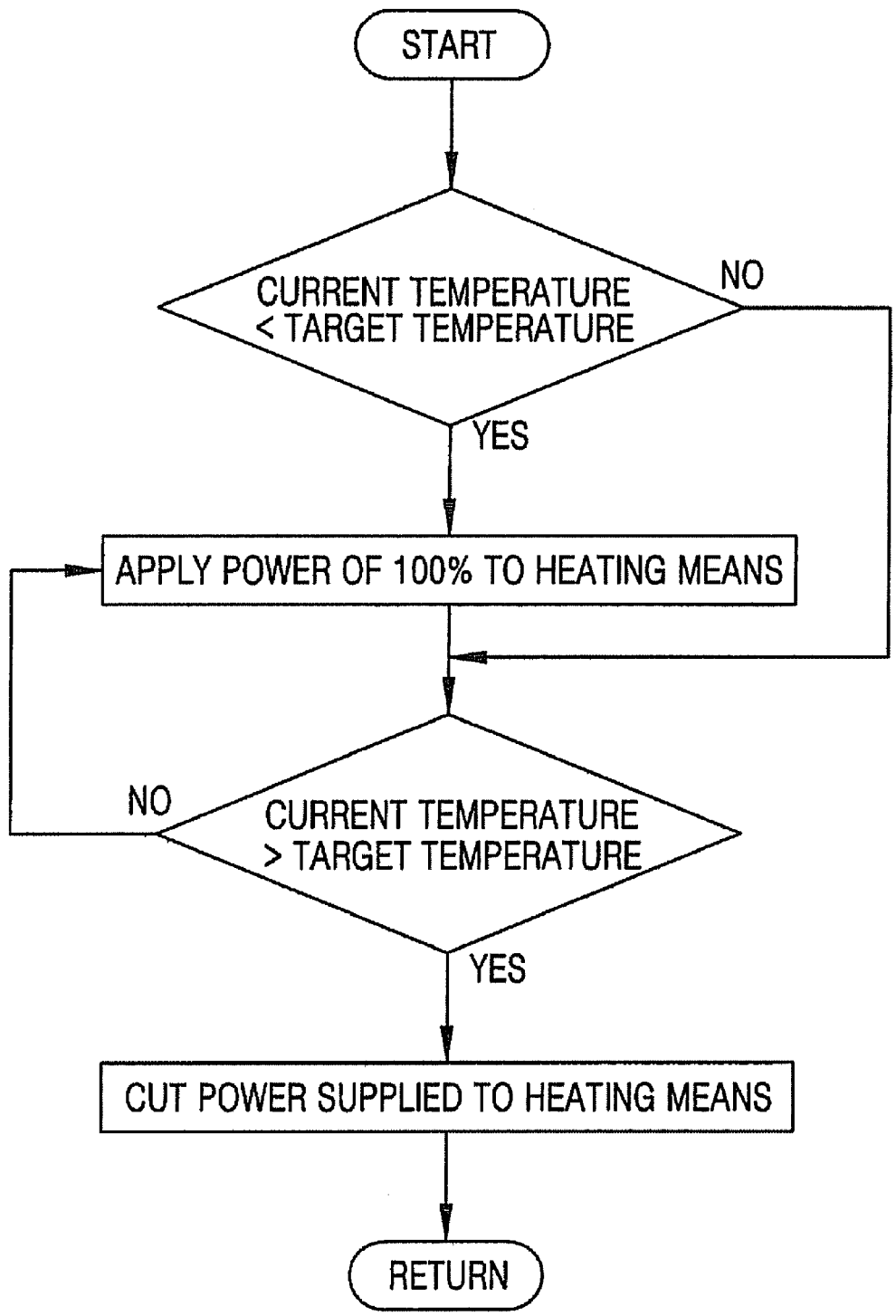
FIG. 2 is a flowchart showing a method of controlling temperature of warm water of the conventional bidet.

Hereinafter, exemplary embodiments of the present invention will be described in detail with reference to FIGS. 1 and 3.

A method of controlling temperature of warm water of a bidet in accordance with an exemplary embodiment of the present invention will be described with reference to the conventional bidet shown in FIG. 1.

The method of controlling temperature of warm water of a bidet in accordance with an exemplary embodiment of the present invention gradually controls intensity of power applied to a heating means 3 depending on a difference between a current temperature T and a target temperature F of warm water in a storage tank 2 detected by a temperature sensor 9 to thereby enable the warm water to be maintained at the target temperature.

Figure 3:
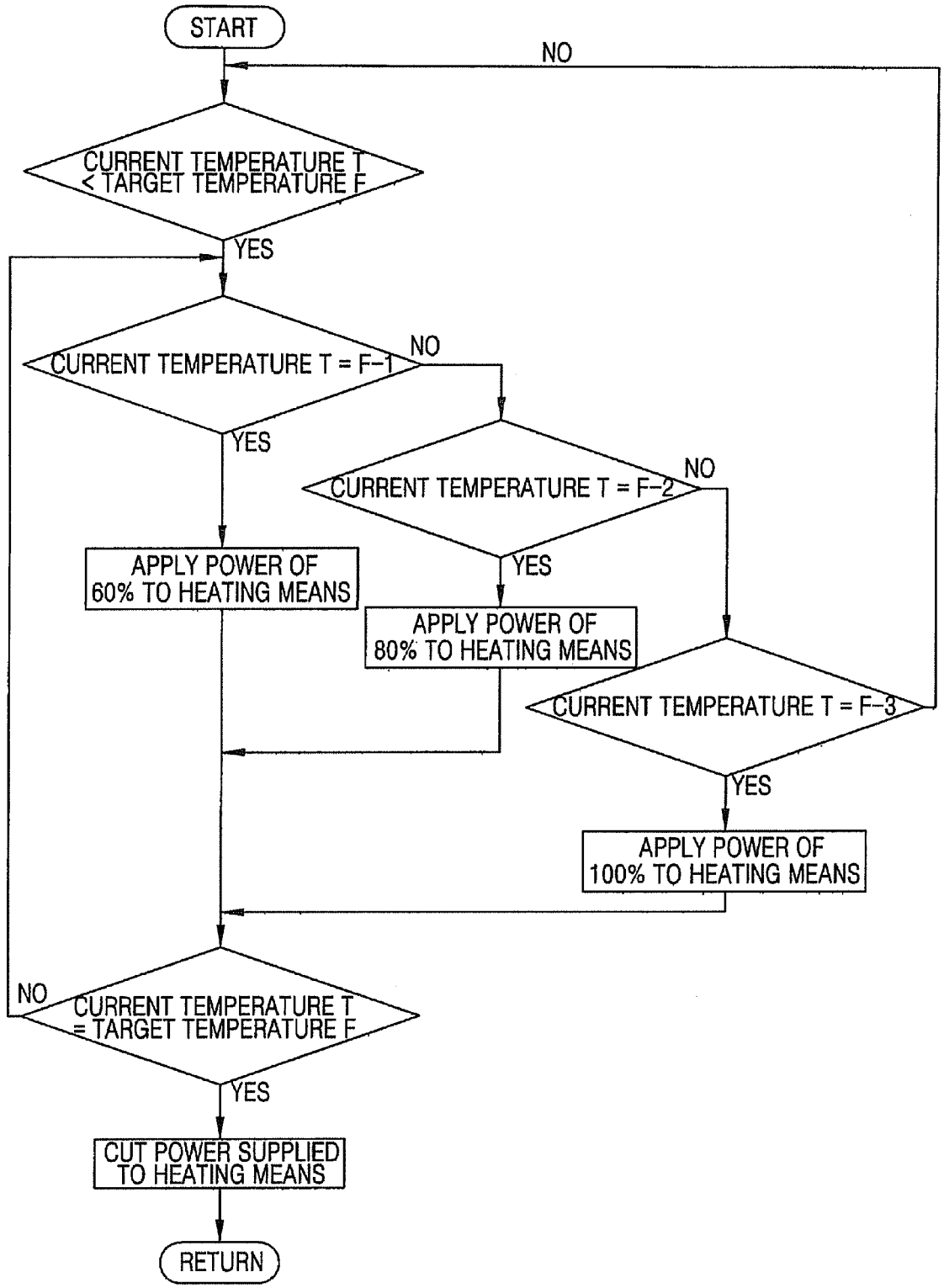
FIG. 3 is a flowchart showing a method of controlling temperature of warm water of a bidet in accordance with an exemplary embodiment of the present invention.

For this purpose, as shown in FIG. 3, the method includes a first step of detecting the current temperature T of warm water stored in the storage tank 2; a second step of gradually adjusting intensity of power supplied to a heating means 3 depending on the difference when the current temperature T of the warm water is lower than the target temperature F; and a third step of cutting the power supplied to the heating means 3 when the current temperature T of the warm water is equal to the target temperature F after the second step.

Operation of the method in accordance with the present invention will be described as an example in which a target temperature of warm water is 40° C.

First, the temperature sensor 9 detects the current temperature T of warm water in the storage tank 2 to supply the detected result to a controller 11, and the controller 11 determines whether the current temperature T is equal to or smaller than the target temperature F.

As a result of the determination, when the current temperature T is lower than the target temperature F, the controller 11 gradually controls the intensity of power supplied to the heating means 3 depending on the difference between the current temperature T and the target temperature F.

For example, when the target temperature F is 40° C. and the current temperature T is 39° C., the controller 11 applies a power of 60% to the heating means 3 to smoothly increase the temperature of the warm water in the storage tank 2. When the current temperature is 38° C., the controller 11 applies a power of 80% to the heating means 3, and when the current temperature is 37° C., the controller 11 applies a power of 100% to the heating means 3 to thereby rapidly increase the temperature of the warm water stored in the storage tank 2.

In addition, after applying a power of 100% to the heating means 3, when the temperature of the warm water detected by the temperature sensor 9 increases, the power applied to the heating means 3 is gradually reduced corresponding to the increment of the temperature.

When the current temperature T of the warm water detected by the temperature sensor 9 arrives at the target temperature F by the above control operation, the controller 11 cuts the power applied to the heating means 3 to prevent overheating of the warm water.

According to the present invention, the temperature of the warm water stored in the storage tank 2 can always maintain a temperature closed to the target temperature F such that a user can use the warm water having a small temperature deviation.

As can be seen from the foregoing, a method of controlling a temperature of warm water of a bidet in accordance with the present invention enables the warm water to be precisely maintained at a temperature closed to a target temperature by checking temperature of cleaning water in a storage tank using a sensor in real time, and gradually controlling intensity of power supplied to a heating means on the basis of the checked water temperature, thereby preventing damage (scald) due to a temperature deviation.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of controlling temperature of warm water of a bidet comprising:
   a first step of detecting a current temperature of warm water stored in a storage tank; and
   a second step of comparing the detected current temperature with a set target temperature, and gradually adjusting intensity of power supplied to a heating means depending on a difference between the current temperature and the target temperature,
   wherein adjusting the intensity of power includes supplying a power of 60% to the heating means when the current temperature is 1° C. lower than the target temperature, supplying a power of 80% to the heating means when the current temperature is 2° C. lower than the target temperature, and supplying a power of 100% the heating means when the current temperature is 3° C. lower than the target temperature.

2. The method according to claim 1, further comprising a third step of cutting the power supplied to the heating means when the current temperature of the warm water is equal to the target temperature after the second step.

* * * * *